Patented May 27, 1941

2,243,129

UNITED STATES PATENT OFFICE 2,243,129

YEAST

Alfred S. Schultz, Bronx, N. Y., assignor to Standard Brands Incorporated, New York, N. Y., a corporation of Delaware No Drawing. Application June 16, 1937, Serial No. 148,509

10 Claims. (Cl. 99—96)

The invention relates to a process for the enrichment of yeast in vitamin $B_1$, and more particularly to the preparation of a vitamin $B_1$ containing extract and its utilization in the treatment of yeast. It includes correlated improvements and discoveries whereby the vitamin $B_1$ content of yeast may be enhanced.

An object of the invention is the provision of a process in which the vitamin $B_1$ content of a yeast may be markedly increased in a ready and effective manner.

Another object of the invention is to provide a procedure for the obtainment of an extract rich in vitamin $B_1$ from rice polish and rice bran.

A further object of the invention is the enhancement of the vitamin $B_1$ content of yeast by subjecting it to the influence of an aqueous extract of rice polish and rice bran.

A more specific object of the invention is the provision of an extract of rice polish and rice bran having a decided vitamin $B_1$ content and suitable for the treatment of yeast.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure.

In the practice of the invention, the vitamin $B_1$ content of yeast, especially baker's yeast, may be augmented by subjecting the yeast to the influence of an aqueous extract of unsaccharified rice polish and rice bran. Suitably the extract is obtained by treating rice polish and rice bran in admixture with water, adding ammonia thereto, and after a given period adjusting the acidity to a pH value of 3.8 to 5. The ammoniacal water utilized for the extraction of the rice polish and rice bran may desirably have a pH value of about 7 to 8, more particularly of 7.5. The acidification may be accomplished through the addition of a mineral acid, as sulfuric, hydrochloric and phosphoric.

The extract containing vitamin $B_1$ may be utilized for increasing the vitamin $B_1$ content of yeast by subjecting yeast to the influence thereof. This may be carried out by placing the yeast in the extract at a pH of about 5.0, and allowing it to remain therein for a period of time, suitably one hour at room temperature and with frequent stirring. At the end of this period the yeast may be removed and the treatment repeated as long as the operation is efficient.

In addition to the foregoing method of treatment subjection to the influence of the extract may be brought about by introducing the extract into the wort or mash in which yeast is grown. This addition may be made at any period throughout the growth of the yeast, or it may follow the growth period by introducing the extract into the fermenter and permitting the yeast to remain in contact therewith. These procedures lead to a marked increase in the vitamin $B_1$ content of yeast. We have readily succeeded in reaching a potency of approximately 120 International units of vitamin $B_1$ per gram under commercial conditions. The medium employed for treatment of the yeast which contains an extract of unsaccharified rice polish and rice bran, preferably an ammoniacal aqueous extract, may have a pH value of from 3.8 to 5.0, and if the value is other than about 5, it is so adjusted for the treatment of yeast therewith.

In the production of the extract, substantially equal amounts of the rice polish and rice bran are utilized and the ratio of ammoniacal water be 1 to 10, or 1 to 5, depending as to whether a higher or lower concentration is deemed to be desirable. The initial extraction is effected with the ammoniacal water, and after a short period, about fifteen minutes, acidification is effected by introducing an inorganic acid, such as sulfuric acid, with the medium having a pH value of about 3.8, and about 4.2.

Following acidification the solid is separated from the liquid which contains the vitamin $B_1$, and this liquid may subsequently be sterilized by means of heat and at a temperature of about 75° C. The sterilization may give rise to the formation of a slight precipitate, which may be removed by filtering. Further, the sterilization may be carried out by heating to about the boiling point, but when the liquid is thus heated there is obtained a white flocculent precipitate, and prior to use this precipitate is removed by filtering.

As an illustrative embodiment of a manner in which a vitamin $B_1$ extract may be produced from rice polish and rice bran and utilized for the enrichment of yeast, the following examples are presented.

*Example I*

A mixture of substantially equal parts of rice polish and rice bran, specifically 1,000 grams of rice polish and 1,000 grams of rice bran, are mixed with about 18.6 liters of water. The admixture is stirred and concentrated ammonia added thereto in an amount of 25 cc. in order to give a pH value of about 7 to 8. After fifteen minutes about 40 cc. of concentrated sulfuric acid are added, lowering the pH value in the neighborhood of 3.8. The mass is stirred and the solid and liquid then separated by filtering in any suitable manner. The liquid obtained may then be sterilized by means of heat and suitably at a temperature of about 75° C. At this temperature little or no precipitation will occur, but if the heating is continued to the boiling point a white flocculent precipitate is formed which may be easily removed by filtration. The extract so obtained may have a pH value of from 3.8 to 5, and a suitable value for the extract for storage purposes is about 4.2. When utilized for the treatment of yeast the pH value may be adjusted to about 5.0 by the addition of a suitable alkali, as ammonium hydroxide, or compounds of sodium and potassium.

Example II

An extract somewhat more concentrated than that produced by Example I may be prepared by admixing 1,000 grams of rice polish and 1,000 grams of rice bran with 10 liters of water, adding thereto about 25 cc. of concentrated ammonia, and after standing for about fifteen minutes introducing about 40 cc. of concentrated sulfuric acid. The mass is then filtered yielding a liquid containing vitamin $B_1$ in a volume of about 6 liters. The filter cake is now mixed with about 8 liters of water, and as a result of a second filtration about 8 liters of a second run extract are obtained, making a total of 14 liters having a vitamin $B_1$ potency as determined by the gas method described in a copending application Serial No. 141,278 equal to 80% or higher of the rice polish. In the event that the acidity of the extract is too great, it may be corrected by the addition of an alkaline substance, and if desired, the extract may be concentrated by use of suitable evaporators.

Example III

The vitamin $B_1$ content of a yeast may be augmented by taking 360 grams of a commercial baker's yeast, diluting to 1 liter with water, and adding thereto 3 liters of the rice polish-bran extract obtained in accordance with the foregoing examples, and which has a pH of about 5. Should the extract have a pH value other than 5, it may be adjusted thereto by the addition of a suitable acid or alkali as may be required. The yeast is subjected to the influence of the rice polish-bran extract for about one hour at room temperature, and with frequent stirring.

Thereafter about 8 liters of water may be added, and the entire mixture separated by means of a yeast separator. The cream yeast so obtained, having a volume of 1.5 to 2 liters, is now incorporated with about 3 liters of the rice polish-bran extract having a pH of about 5.0, allowed to remain for one hour, and separated. This procedure may be repeated, for example, two more times, thus subjecting the yeast to the influence of a plurality of portions of the aqueous extract from the rice polish and bran. After the successive treatments the cream yeast is diluted to about 12 liters with water, separated, thus giving it a washing, and finally it is filtered.

Following filtration the yeast is dried at a temperature of 30–35° C., and the vitamin $B_1$ content determined by the gas method. This method, briefly, entails the preparation of a synthetic sugar wort, and inoculating a portion of the wort with the yeast to be tested, and also with a yeast and a given amount of synthetic crystalline vitamin $B_1$. The amounts of gas evolved are determined and compared, and the $B_1$ content of the prepared yeast thus ascertained. The extract utilized in this example contained .8 International unit of vitamin $B_1$ per cc. Since a total of four treatments, utilizing 3,000 cc. for each treatment were made, the amount of extract to which the yeast was subjected was 12,000 cc., and $12,000 \times .8$ equals 9600 International units. The solids of the yeast treated may be considered as about 100 grams, and since the yeast, by the gas test, showed a vitamin $B_1$ content of 80 International units per gram dry, the total amount of yeast contained 8,000 units, and hence the efficiency of the process is about 80%.

Example IV 60 grams of yeast of the type we designate commercial, were added to 400 cc. of the unsaccharified rice polish-bran extract, and into the mixture thus obtained 600 cc. of water were introduced. The pH of the extract was adjusted to about 5.0 before intermixture with the yeast. The mass was stirred for about 15 minutes and then filtered. This yeast was subjected to a second and third treatment of a similar nature, with the period of treatment lengthened to about one hour. The yeast obtained was analyzed for solids, and then dried, and the vitamin $B_1$ content determined. The results are given below.

| Grams yeast | Solids | Total solids | Int. $B_1$ per g. by gas | Total units | Units from 1200 cc. ext. about 650 Int. units | Efficiency |
|---|---|---|---|---|---|---|
| | Percent | Grams | | | | Percent |
| 60 (check) | 31.67 | 19 | 6 | 114 | | |
| Same yeast after 3 (400 cc.) ext. treatments | | | 37 | 700 | 586 | 90 |

This shows that the yeast may be increased in vitamin $B_1$ content to 37 International units, and that the procedure is about 90% efficient.

Example V

Enrichment of yeast in vitamin $B_1$ content through utilization of the extract of unsaccharified rice polish and rice bran during the growing of yeast, or in the fermenter, is shown by the following tabulation:

| Seed | Molasses | Plus | Yield 27% solids | By gas Int. $B_1$/g. dry yeast | Total Int. units | Increase Int. units due to extract |
|---|---|---|---|---|---|---|
| | Grams | | | | | |
| 1 | 300 | | 96 | 5 | 475 | |
| 2 | 300 | | 87 | 5 | 440 | |
| 3 | 300 | | 69 | 8 | 576 | |
| Like 1 | 300 | 2000 cc. extract. | 97 | 12 | 1152 | 685 |
| Like 2 | 300 | do | 82 | 13 | 1086 | 646 |
| Like 3 | 300 | do | 68 | 21 | 1491 | 915 |

The extract introduced is that which may be prepared by Examples I and II by treatment of rice polish and rice bran with ammoniacal water at a pH of about 7.5, acidification with sulfuric acid with separation of solid and liquid, and obtainment of an extract having a pH value of about 4.2. The pH at the completion of each fermentation was set at about 4.5 to 5.2.

It will be noted that there is a marked increase in the vitamin $B_1$ content of the yeast which is subjected to the influence of the rice polish-bran extract during its growth. Thus, the type 1 yeast gave an increase of 685 units, type 2 yeast an increase of 646 units, and type 3 an increase of 915 units. On the basis of 1,000 units in the extract, the efficiency is about 65% for the type 1, and the type 2 yeast, and about 90% for the type 3.

The foregoing procedures provide a medium rich in vitamin $B_1$, and obtained by an ammoniacal water extraction of rice polish and rice bran, which is well adapted for the treatment of yeast. The treatment of yeast therewith, at a suitable pH value, either before or after growing or propagation, leads to the obtainment of a yeast of distinctly higher vitamin $B_1$ content. The efficiency of the procedure is decidedly high and may reach 90% in the case of a type 3 yeast. Thus, there is provided a ready, effective and economical manner whereby the vitamin $B_1$ content of yeast may be augmented without decrease in yield of the yeast and without undesirable effects upon the yeast, either as to baking strength, keeping qualities, or color.

Since certain changes in carrying out the above process, and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. A process for preparing a composition containing vitamin $B_1$, which comprises extracting a mixture of rice polish and rice bran with ammoniated water, acidifying to a pH value of 3.8 to 5, and separating solid from liquid whereby a liquid rich in vitamin $B_1$ is obtained.

2. A process for preparing a composition containing vitamin $B_1$, which comprises extracting a mixture of rice polish and rice bran with ammoniacal water at a pH value of 7 to 8, acidifying to a pH value of 3.8 to 5, and separating solid from liquid whereby a liquid rich in vitamin $B_1$ is obtained.

3. A process for preparing a composition containing vitamin $B_1$, which comprises extracting a mixture of rice polish and rice bran with ammoniacal water at a pH value of 7 to 8, acidifying with sulfuric acid to a pH value of 3.8 to 5, separating solid from liquid whereby a liquid rich in vitamin $B_1$ is obtained, and sterilizing the liquid.

4. A process for preparing a composition containing vitamin $B_1$, which comprises extracting a mixture of rice polish and rice bran with ammoniacal water at a pH value of 7 to 8, acidifying with sulfuric acid to a pH value of 3.8 to 5, separating solid from liquid whereby a liquid rich in vitamin $B_1$ is obtained, and sterilizing the liquid by heating to a temperature of about 75° C.

5. A process for preparing a composition containing vitamin $B_1$, which comprises admixing rice polish and rice bran with water, adding aqueous ammonia to a pH value of about 7.5, acidifying by means of sulfuric acid to a pH value of about 4.2, separating solid from liquid whereby a liquid enriched in vitamin $B_1$ is obtained, and sterilizing the liquid by heating to a temperature of about 75° C.

6. A process for preparing a composition containing vitamin $B_1$, which comprises admixing rice polish and rice bran with water, adding aqueous ammonia to a pH value of about 7.5, acidifying by means of sulfuric acid to a pH value of about 4.2, separating solid from liquid whereby a liquid enriched in vitamin $B_1$ is obtained, sterilizing by heating the liquid thus obtained until a white flocculent precipitate is formed, and removing precipitate so produced.

7. A process for preparing a composition containing vitamin $B_1$, which comprises admixing rice polish and rice bran in substantially equal quantities with water, adding aqueous ammonia to a pH value of about 7.5, acidifying with sulfuric acid to a pH value of about 4.2, separating solid from liquid whereby liquid enriched in vitamin $B_1$ is obtained, and sterilizing by means of heat.

8. A process for increasing the vitamin $B_1$ content of yeast, which comprises placing yeast in a medium containing an aqueous extract of unsaccharified rice polish and rice bran at a pH of about 5, allowing said yeast to remain therein for a period of time with agitation at room temperature, and separating yeast from said medium.

9. A process for increasing the vitamin $B_1$ content of yeast, which comprises placing yeast in a medium containing an aqueous extract of unsaccharified rice polish and rice bran which has been heated to a temperature of about 75° C. and cooled, at a pH of about 5, allowing said yeast to remain therein for a period of from 15 minutes to one hour with agitation at room temperature, and separating yeast from said medium.

10. A process for increasing the vitamin $B_1$ content of yeast, which comprises preparing an acidified ammoniacal aqueous extract of unsaccharified rice polish and rice bran, inoculating a medium containing said extract and having a pH of about 5 with yeast, growing the yeast therein, and separating yeast from said medium.

ALFRED S. SCHULTZ.